United States Patent [19]

Niikura et al.

[11] Patent Number: 5,396,421
[45] Date of Patent: Mar. 7, 1995

[54] TORQUE DISTRIBUTION CONTROL DEVICE

[75] Inventors: Yasuhiro Niikura; Tokiyoshi Yanai; Akihiko Sano, all of Kanagawa, Japan

[73] Assignee: Nissan Motor Co., Ltd., Yokohama, Japan

[21] Appl. No.: 794,220

[22] Filed: Nov. 19, 1991

[30] Foreign Application Priority Data

Nov. 20, 1990 [JP] Japan ................. 2-314814

[51] Int. Cl.$^6$ .............................................. B60K 41/16
[52] U.S. Cl. ............................ 364/424.1; 364/424.01; 475/150; 475/210; 475/242; 180/248; 180/233; 180/249; 192/60
[58] Field of Search ................. 364/424.1; 180/248, 180/233, 247, 197, 249; 74/866, 867; 475/150, 152, 156, 210, 206, 242, 247

[56] References Cited

U.S. PATENT DOCUMENTS

| 4,609,064 | 9/1986 | Suzuki et al. | 180/233 |
| 4,829,433 | 5/1989 | Nakano et al. | 364/424.1 |
| 4,887,689 | 12/1989 | Naito | 180/233 |
| 4,921,085 | 5/1990 | Takemura et al. | 192/60 |
| 4,932,510 | 6/1990 | Takemura et al. | 192/60 |
| 4,938,306 | 7/1990 | Sumiyoshi et al. | 180/233 |
| 4,957,473 | 9/1990 | Takemura et al. | 475/231 |
| 4,958,711 | 9/1990 | Okubo et al. | 192/60 |
| 4,966,249 | 10/1990 | Imaseki | 180/233 |
| 4,966,250 | 10/1990 | Imaseki | 180/233 |
| 4,986,388 | 1/1991 | Matsuda | 180/248 |
| 5,017,183 | 5/1991 | Teraoka | 475/150 |
| 5,060,747 | 10/1991 | Eto | 180/197 |
| 5,099,944 | 3/1992 | Kageyama et al. | 180/249 |

FOREIGN PATENT DOCUMENTS

| 62-94421 | 4/1987 | Japan . |
| 62-181915 | 8/1987 | Japan . |
| 62-181916 | 8/1987 | Japan . |
| 62-181917 | 8/1987 | Japan . |

Primary Examiner—Kevin J. Teska
Assistant Examiner—Jacques Harold Louis-Jacques
Attorney, Agent, or Firm—Foley & Lardner

[57] ABSTRACT

A torque distribution control device includes two rotational speed differential responsive type control couplings each having various transfer torque characteristics which differ in the ratio of a transfer torque to a rotational speed differential. The control device selects one of the torque transfer characteristics in response to a signal supplied thereto. When turning the outer wheel side control coupling is supplied with a signal for selecting the transfer torque characteristic that produces a maximum transfer torque for a given rotational speed differential, and the inner wheel side control coupling is supplied with a signal for attaining a non-slip rotational speed differential and for selecting the transfer torque characteristic that produces a transfer torque equal to that produced by the outer wheel side control coupling when the non-slip rotational speed differential is obtained. When the vehicle is running straight ahead, both control couplings are supplied with signals for selecting the transfer torque characteristics that produce maximum transfer torque for a given rotational speed differential.

14 Claims, 9 Drawing Sheets

| V<br>R | V1 | V2 | V3 | V4 | V5 | V6 |
|---|---|---|---|---|---|---|
| R1 | ΔN1 | ΔN2 | ΔN3 | ΔN4 | ΔN5 | ΔN6 |
| R2 | ΔN7 | ΔN8 | ΔN9 | ΔN10 | ΔN11 | ΔN12 |
| R3 | ΔN13 | ΔN14 | ΔN15 | ΔN16 | ΔN17 | ΔN18 |
| R4 | ΔN19 | ΔN20 | ΔN21 | ΔN22 | ΔN23 | ΔN24 |
| R5 | ΔN25 | ΔN26 | ΔN27 | ΔN28 | ΔN29 | ΔN30 |

TORQUE DISTRIBUTION CONTROL DEVICE

BACKGROUND OF THE INVENTION

1. Field of the Invention

The present invention relates to a torque distribution control device disposed between laterally opposed vehicle wheels for controlling distribution of engine torque to the wheels independently.

2. Description of the Prior Art

An example of a prior art torque distribution control device is disclosed in Japanese Patent Provisional Publication Nos. 62-94421 and 62-181915.

The Japanese Patent Provisional Publication No. 62-94421 discloses two multi-disk clutches incorporated in a vehicle drive line for controlling distribution of engine torque to laterally opposed vehicle wheels independently. The multi-disk clutches are adapted to increase distribution of engine torque, upon low-to-middle speed turning, to the outer wheel for thereby improving the turning ability and, upon high-speed turning, to the inner wheel for thereby improving the turning stability.

The Japanese Patent Provisional Publication No. 62-181915 discloses two hydraulic clutches incorporated in a longitudinal vehicle drive line for controlling distribution of engine torque to laterally opposed rear wheels independently. Japanese Patent Provisional Publication No. 62-181916 discloses to control, by utilizing a similar arrangement, distribution of engine torque to laterally opposed vehicle wheels in response to a vehicle speed and steering angle, particularly with a view to preventing a spin of the more lightly loaded one of the wheels. Japanese Patent Provisional Publication No. 62-181917 discloses to control, by utilizing a similar arrangement, distribution of engine torque to laterally opposed vehicle wheels in response to a steering angle and lateral acceleration with a view to improving the turning ability and stability.

The above described prior art torque distribution control devices encounter the following problems.

(1) The clutches utilized in the prior art devices do not allow, when supplied with a high hydraulic fluid pressure and put into complete engagement, any relative rotation between input and output members. Due to this, it is necessitated, upon turning, to reduce the torque transmitted to the inner wheel for thereby producing a rotational speed differential between the laterally opposed vehicle wheels, resulting in the total amount of the torque transmitted to the laterally opposed pair of driving wheels being reduced and therefore the driveability at turning is deteriorated.

(2) The prior art control disclosed by Japanese Patent Provisional Publication No. 62-94421 is adapted to make a difference in torque distribution between laterally opposed vehicle wheels upon turning. Due to this, an improved turning ability and turning stability in response to a road surface condition, accelerating operation, etc. cannot always be attained. For example, a tendency to a strong oversteer is caused upon low-to-middle speed turning or a tendency to a strong understeer is caused upon high-speed turning.

The prior art control disclosed by Japanese Patent Provisional Publication No. 62-181916 has a tendency of causing, when executed in such a manner that the torque distribution conforms to the load distribution, a strong oversseer upon highly laterally accelerated turning in which the load on the inner wheel is reduced rapidly.

Further, the prior art control disclosed by Japanese Patent Provisional Publication No. 62-181917 has a tendency of causing, when executed so as to reduce the torque distribution to the laterally accelerated outer wheel, a strong understeer upon high-speed turning.

(3) A hydraulic pressure source, accumulator and actuator including a control valve, etc. are necessitated, resulting in the devices being large-sized and heavy.

SUMMARY OF THE INVENTION

In accordance with the present invention, there is provided a novel and improved torque distribution control device for a vehicle having two laterally opposed wheels, two output shafts respectively connected to the wheels to rotate therewith, and an input shaft for supplying an engine torque to the output shafts.

The control device comprises a first rotational speed differential responsive type control coupling disposed between the input shaft and one of the output shafts, and a second rotational speed differential responsive type control coupling disposed between the input shaft and the other of the output shafts.

The first and second control couplings each have various transfer torque characteristics and are operable to select one of the torque transfer characteristics in response to a signal supplied thereto.

The control device further comprises vehicle running condition detecting means for detecting a vehicle running condition and producing a signal representative thereof and control means for supplying to each of the first and second control couplings a signal for controlling selection of the torque transfer characteristics in response to the signal from the vehicle running condition detecting means.

According to an aspect of this invention, the vehicle running condition detecting means comprises turning direction detecting means for detecting a turning direction of the vehicle and producing a signal representative thereof, vehicle speed detecting means for detecting a vehicle speed and producing a signal representative thereof, turning radius computing means for computing a turning radius and producing a signal representative thereof, and target rotational speed differential computing means responsive to the signals from the vehicle speed detecting means and turning radius computing means for computing a target rotational speed differential between the wheels, which is necessitated for turning without slip between tire and road surface, on the basis of the vehicle speed and turning radius. The control means is adapted for supplying, upon turning, to an outer wheel side one of the control couplings which is determined on the basis of the signal from the turning direction detecting means, a signal for selecting such one of the transfer torque characteristics that can produce a maximum transfer torque for a given rotational speed differential and to an inner wheel side one of the control couplings a signal for selecting, when the target rotational speed differential is obtained, such one of the transfer torque characteristics that can produce a transfer torque equal to that produced by the outer wheel side one of the control couplings.

The above structure is effective for solving the above noted problems inherent in the prior art device.

It is accordingly an object of the present invention to provide a novel and improved torque distribution control device which can attain an improved driveability upon turning and a high turning stability irrespective of a road surface condition, accelerating operation, etc.

It is a further object of the present invention to provide a novel and improved torque distribution control device which is compact and light in weight.

DETAILED DESCRIPTION OF THE PREFERRED EMBODIMENTS

Figure 1:
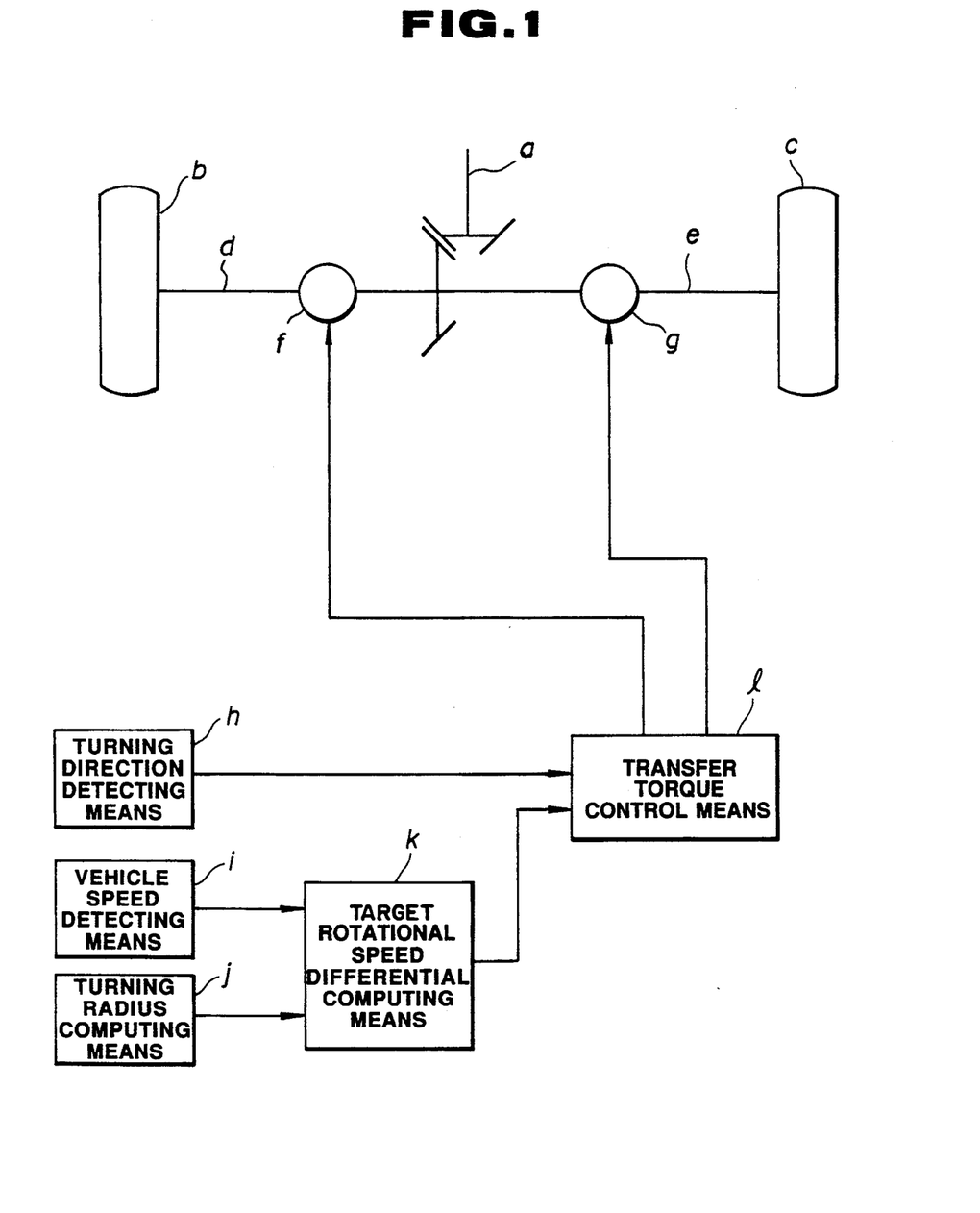
FIG. 1 is a diagrammatic view of a torque distribution control device according to an embodiment of the present invention.

Referring first to FIG. 1, a torque distribution control device according to an embodiment of the present invention is described.

The torque distribution control device of this invention includes two rotational speed differential responsive type control couplings adapted to operate in such a manner that, upon turning, the outer wheel side control coupling produces a maximum transfer torque for a given rotational speed differential and the inner wheel side control coupling allows, between laterally opposed vehicle wheels, a rotational speed differential that is necessary for grip-running (i.e., running without any slip between tire and road surface) and produces a transfer torque equal to that of the outer wheel when the necessary or target rotational speed differential is obtained.

More specifically, the torque distribution control device includes a first rotational speed differential responsive type control coupling "f" and a second rotational speed differential responsive type control coupling "g" disposed between an input drive shaft "a" and respective output drive shafts "d" and "e", which drive shafts are respectively connected to laterally opposed vehicle wheels "b" and "c", each for producing a transfer torque in response to a rotational speed differential to which the control couplings "f" and "g" are subjected and operable to select one of various transfer torque characteristics, which differ in the ratio of a transfer torque to a rotational speed differential, in response to an external signal, i.e., a signal supplied thereto from the outside, a turning direction detecting means "h" for detecting a turning direction of a vehicle, a vehicle speed detecting means "I" for detecting a vehicle speed, a turning radius computing means "j" for computing a turning radius, a target rotational speed differential computing means "k" for computing a target rotational speed differential between the vehicle wheels, which target rotational speed differential enables the vehicle to run without slip between tire and road surface, in accordance with the vehicle speed and turning radius, and a control means "l" for supplying to the outer wheel side coupling "f" or "g" a signal for selecting a torque transfer characteristic capable of producing a maximum transfer torque for a given rotational speed differential and to the inner wheel side coupling "g" or "f" a signal for enabling the inner wheel side coupling to produce a transfer torque equal to that produced by the outer wheel side coupling when the rotational speed differential is obtained.

The torque distribution control device operates as follows.

In the event of turning, on the basis of the turning direction detected by the turning direction detecting means "h", the outer wheel and inner wheel are determined. The control means "l" supplies to the outer wheel side control coupling "f" or "g" a signal for selecting a torque transfer characteristic capable of producing a maximum transfer torque for a given rotational speed differential and to the inner wheel side control coupling "g" or "f" a signal for selecting a torque transfer characteristic capable of producing a transfer torque equal to that produced by the outer wheel side control coupling "f" or "g", i.e., equal to that transmitted to the outer wheel when the target rotational speed differential between the wheels is reached.

In this instance, the target rotational speed differential between the wheels is computed by the target rotational differential computing means "k" on the basis of the vehicle speed detected by the vehicle speed detecting means "i" and the turning radius computed by the turning radius computing means "j".

Accordingly, in the event of grip-turning (i.e., turning without slip between tire and road surface), the torque distribution control device of this invention has a differential function of reducing the speed of rotation of the inner wheel relative to that of the outer wheel by the amount corresponding to the necessary rotational speed differential. Further, the torque distribution control device has an even torque distribution function of evenly distributing an engine torque to the driving wheels similarly to the conventional differential gear.

Figure 2:
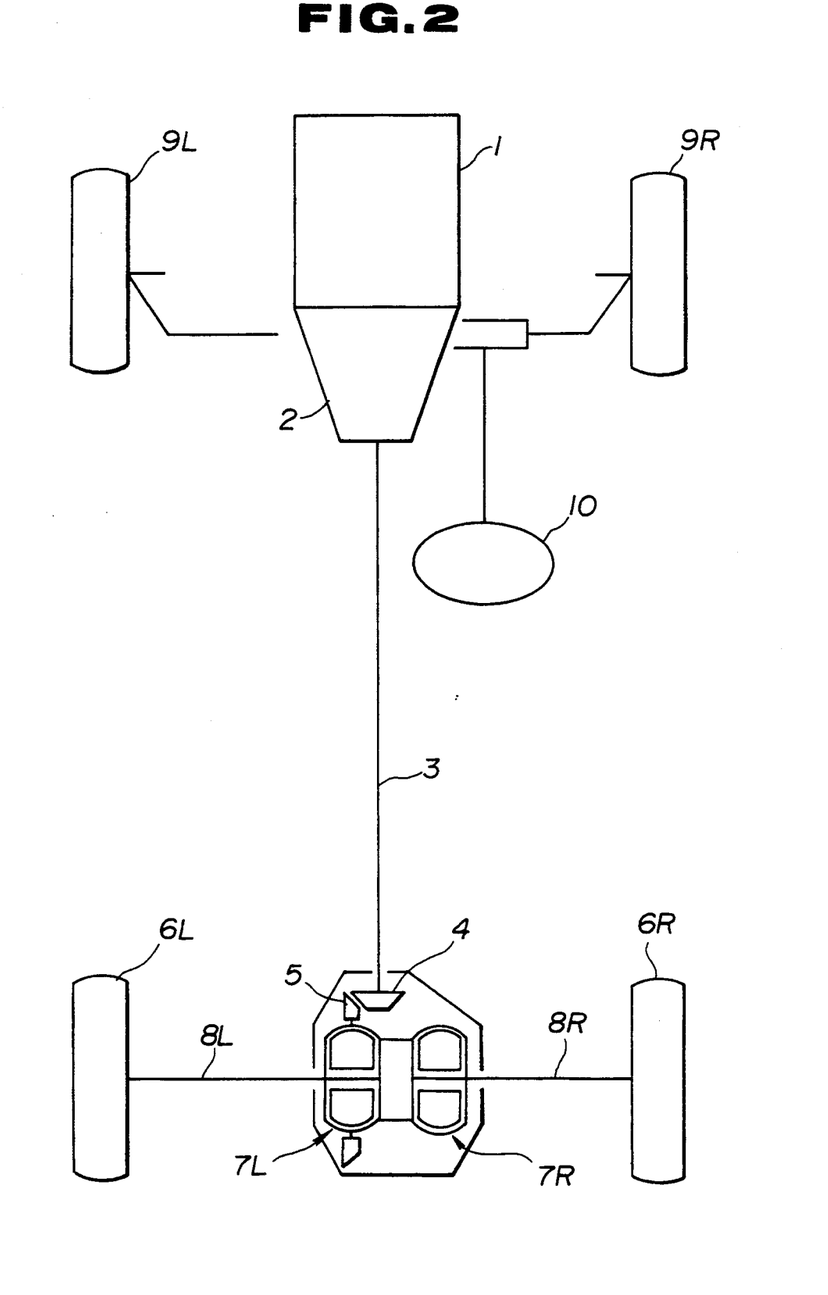
FIG. 2 is a schematic view of a power train for a rear wheel drive vehicle, in which a torque distribution control device according to another embodiment of the present invention is incorporated.
Figure 3:
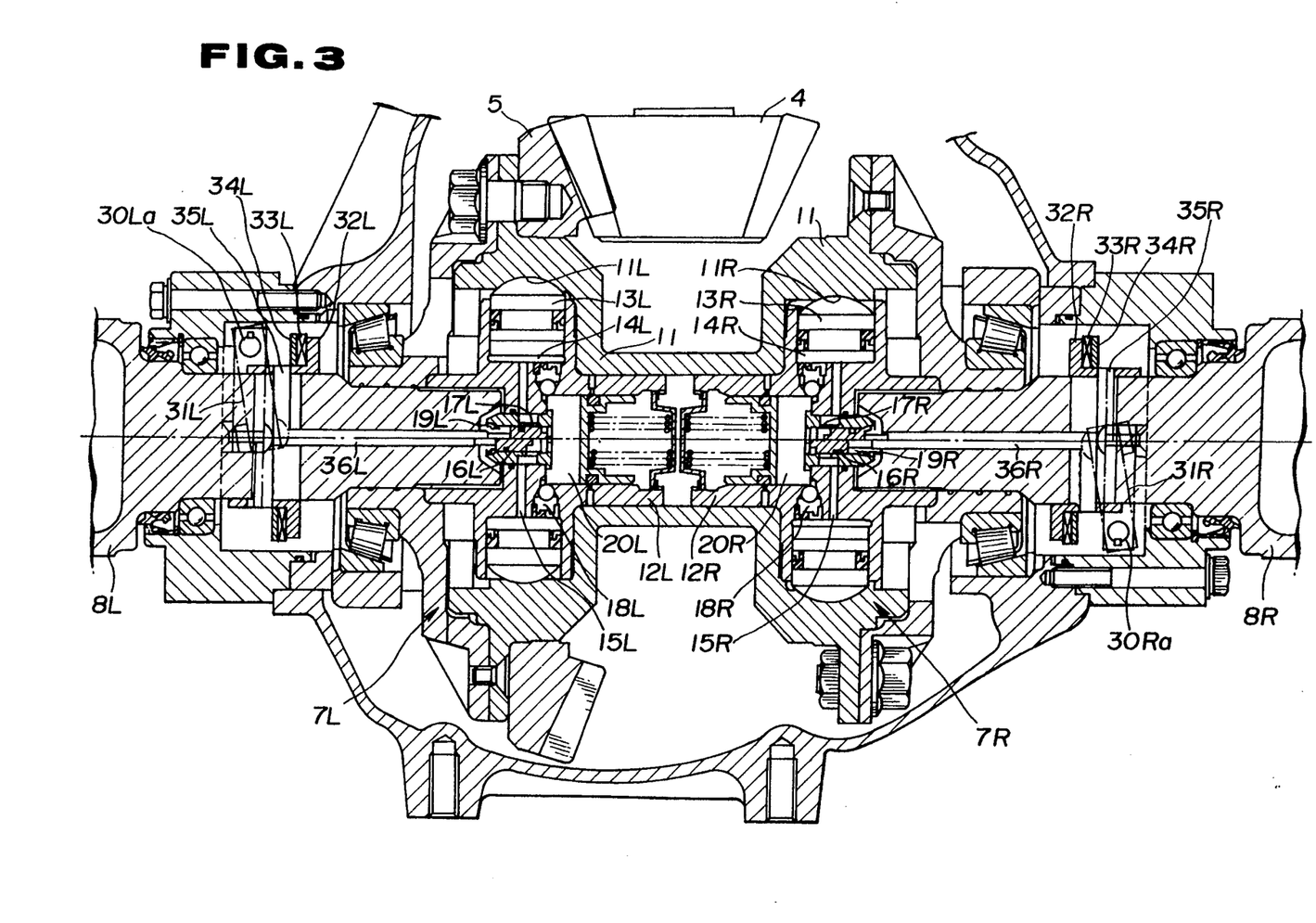
FIG. 3 is an enlarged sectional view of the torque distribution control device and is associated final drive portion of the power train of FIG. 2.
Figure 4:
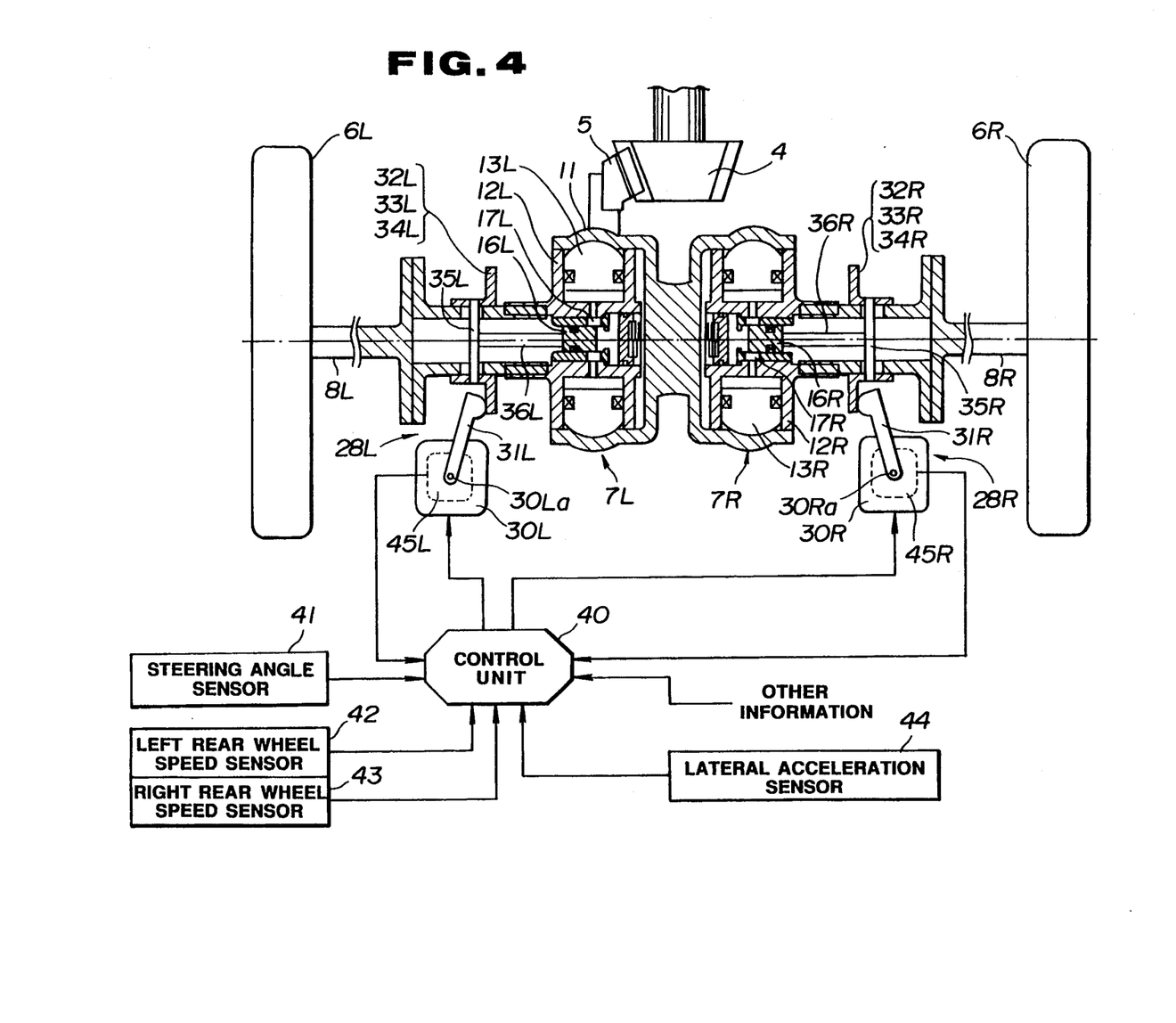
FIG. 4 is a schematic view of the torque distribution control device of FIG. 2.

Referring to FIGS. 2 to 4 inclusive, a torque distribution control device according to a further embodiment of the present invention will be described.

In FIG. 2, a torque distribution control device according to a further embodiment of the present invention is shown by way of example as being incorporated in a power train for a rear wheel drive vehicle. The vehicle has at the front a longitudinal engine 1 and transmission 2. The torque or power of the engine 1 is transmitted through the transmission 2, propeller shaft (input shaft) 3 and drive pinion 4 to a ring gear 5 and further to a left rear wheel 6L, when viewed from the rear of the vehicle, through a first rotational speed differential responsive type control coupling 7L and left drive axle (output shaft) 8L and to a right rear wheel 6R through a second rotational speed differential responsive type control coupling 7R and right drive axle (output shaft) 8R.

Front wheels 9L and 9R are not driven by the engine 1 and are adapted to serve as dirigible wheels which are turned in response to an operation of a steering wheel 10.

The control couplings 7L and 7R are built in or combined with a final drive assembly or more specifically disposed between the propeller shaft 3 and the respective rear drive axles 8L and 8R. Each control coupling produces a transfer torque in response to a rotational speed differential to which the control couplings 7L and 7R are subjected and are capable of selecting, through control of an opening of a variable orifice, one of various transfer torque characteristics which differ in the ratio of transfer torque to a rotational speed differential.

As shown in FIG. 3, the control couplings 7L and 7R include cam rings 11 which are joined together to constitute an integral unit and formed with two rise and fall cam surfaces 11L and 11R at the inner periphery thereof. The integral unit of the cam rings 11 has secured thereto the ring gear 5. Each of the control couplings 7L and 7R further includes a rotor 12L or 12R accommodated concentrically within each cam ring 11 and splined to the drive axle 8L or 8R, six radial pistons 13L or 13R installed in the rotor 12L or 12R for reciprocation while being driven by the cam surface 11L or 11R in response to a rotational speed differential between the cam ring 11 and the rotor 12L or 12R, pressure chambers 14L or 14R defined by the pistons 13L or 13R and variable in volume in response to reciprocations of the pistons 13L or 13R, radial discharge passages 15L or 15R in communication with the respective pressure chambers 14L or 14R, variable orifices 17L or 17R disposed at the radially inner ends of the respective discharge passages 15L or 15R and cooperating with a spool 16L or 16R so as to be variable in opening in response to axial movement of the spool 16L or 16R, regulator passages 18L or 18R extending between the respective pressure chambers 14L or 14R and an accumulator chamber 20L or 20R by way of check valves (no numeral), and a spool chamber 19L or 19R disposed between the variable orifices 17L or 17R and the accumulator chamber 20L or 20R for providing communication therebetween and accommodating therein the spool 16L or 16R.

The rise and fall cam surfaces 11L or 11R, pistons 13L or 13R, pressure chambers 14L or 14R, and discharge passages 15L or 15R constitute hydraulic fluid discharge means for discharging a quantity of hydraulic fluid proportional to a rotational speed differential between the rotor 12L or 12R and cam ring 11.

The construction and operation of the control couplings 7L and 7R are basically similar to those described in U.S. Pat. Nos. 4,921,085; 4,957,473; and 4,958,711 and therefore a further description of them is omitted for brevity.

Stepping motors 30L and 30R are employed to constitute an orifice actuator for varying the degree of opening of the variable orifices 17L and 17R in response to an external signal. Control motion transmitting mechanisms 28L and 28R are respectively provided between shafts 30La and 30Ra of the stepping motors 30L and 30R and the spools 16L and 16R for transmitting control motions of the stepping motors 30L and 30R to the spools 16L and 16R. To this end, each of the control motion transmitting mechanisms 28L and 28R includes, as shown in FIGS. 3 and 4, a fork 31L or 31R secured at an end to the shaft 30La or 30Ra to rotate together therewith, slide ring 32L or 32R axially moveably installed on the rear drive axle 8L or 8R, needle bearing 33L or 33R, thrust plate 34L or 34R installed on the slide ring 32L or 32R by way of the needle bearing 33L or 33R and held in contact with a free end of the fork 31L or 31R to move therewith, transverse pin 35L or 35R extending transversely of the rear drive axle 8L or 8R, and a push rod 36L or 36R interposed between the transverse pin 35L or 35R and the spool 16L or 16R for transmitting motion of the transverse pin 35L or 35R to the spool 16L or 16R.

A control unit 40 mainly consisting of a microcomputer is employed to constitute an orifice control means for supplying a control signal to the stepping motors 30L and 30R and thereby controlling the orifice opening of the variable orifices 17L and 17R. A steering angle sensor 41 is employed to constitute the aforementioned turning direction detecting means for detecting an angle of rotation of the steering wheel 10, i.e., a steering angle, and supplying a signal representative thereof to the control unit 40. A left rear wheel speed sensor 42 is employed for detecting the speed of rotation of the left rear wheel 6L and supplying a signal representative thereof to the control unit 40. A right rear wheel speed sensor 43 is employed for detecting the speed of rotation of the right rear wheel 6R and supplying a signal representative thereof to the control unit 40. A lateral acceleration sensor 44 is employed for detecting a lateral acceleration of the vehicle and supplying a signal representative thereof to the control unit 40. Potentiometers 45L and 45R are employed and respectively installed on the stepping motors 30L and 30R for detecting angular positions or rotations of the shafts 30La and 30Ra of the stepping motors 30L and 30R and supplying signals representative thereof to the control unit 40.

The torque distribution control device of this invention operates as follows.

Figure 5:
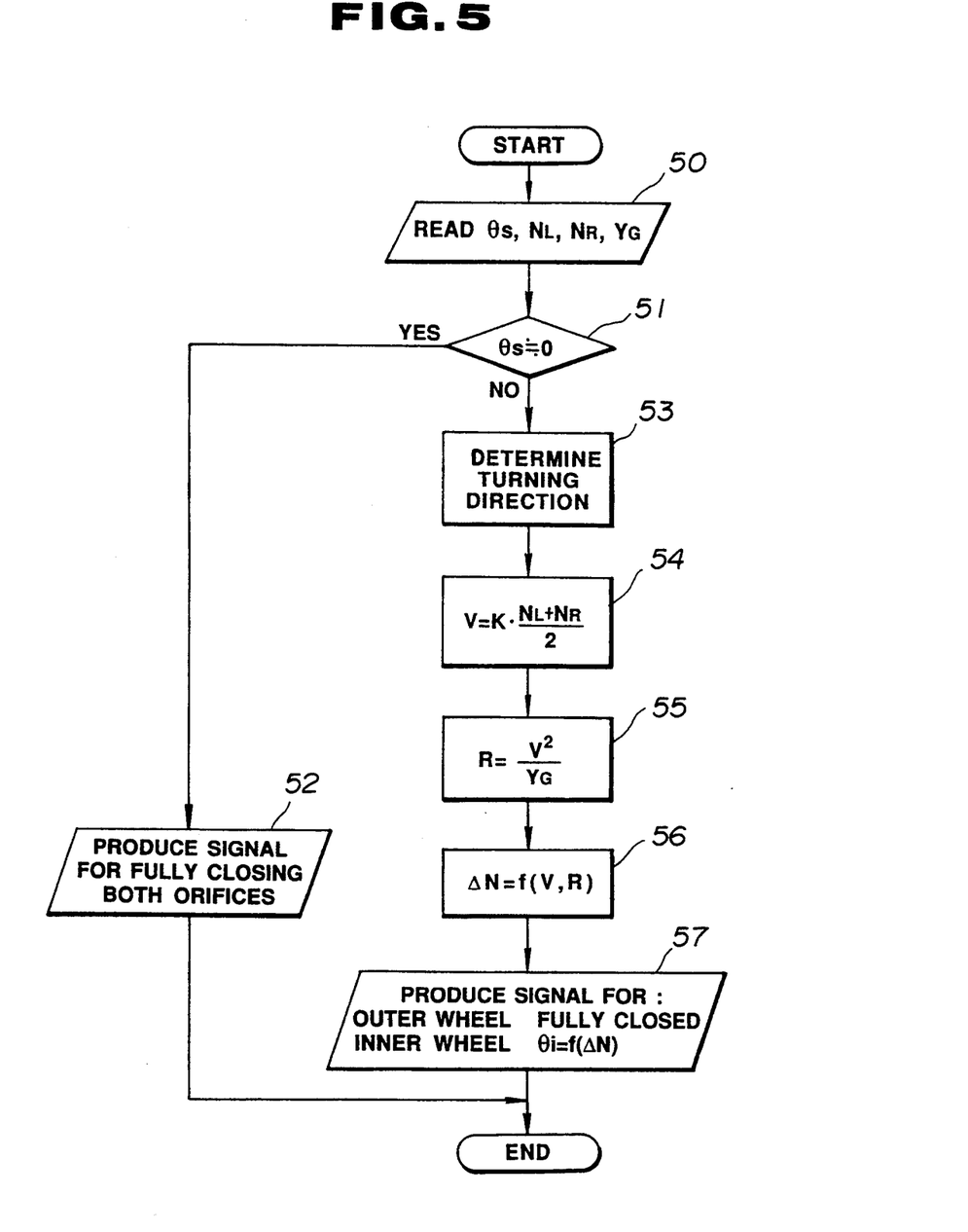
FIG. 5 is a flowchart of a routine of control operations executed by the torque distribution control device of FIG. 2.

FIG. 5 shows a routine of control operations executed by the control unit 40 repeatedly with a predetermined control cycle (e.g., 10 msec).

At step 50, a steering angle $\theta s$, left and right rear wheel speeds NL and NR and lateral acceleration YG are read.

At step 51, it is judged whether the steering angle $\theta s$ is nearly zero.

When it is judged that $\theta s \approx 0$, i.e., the vehicle is running straight ahead, the control proceeds to step 52 to produce signals for fully closing the orifices 17L and 17R.

On the other hand, when it is judged that $\theta s \neq 0$, i.e., the vehicle is turning a corner, the control proceeds to steps 53 to 57.

At step 53, the turning direction is judged from the wave-form of the signal representative of the detected steering angle $\theta s$.

At step 54, the vehicle speed V is obtained from an average of the rear wheel speeds NL and NR, i.e., an average of the speeds of rotation of the rear wheels 6L and 6R, and from the following expression which constitute part of a vehicle speed detecting means and in which K is constant.

$$V = K\left(\frac{N_L + N_R}{2}\right)$$

At step 55, the turning radius R is obtained from the vehicle speed V and the lateral acceleration YG and from the following expression which constitute part of a turning radius computing means.

$$R = V^2/YG$$

At step 56, the left and right rotational speed differential is computed, on the basis of the vehicle speed V and the turning radius R, from the following expression which constitutes part of a target rotational speed differential computing means.

Figure 6:
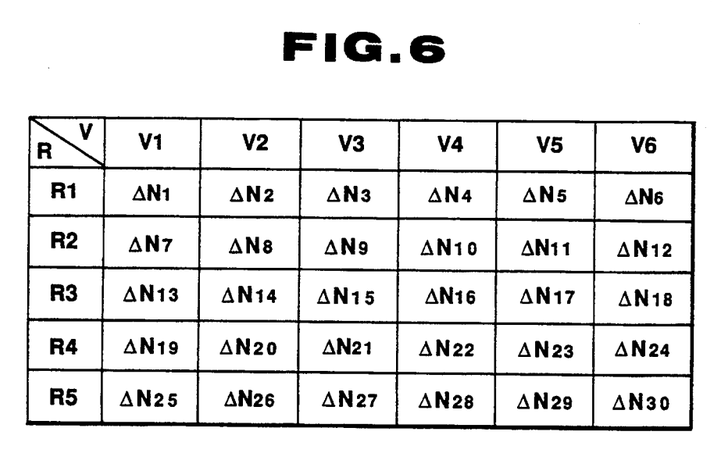
FIG. 6 is a table for obtaining a target rotational speed differential between wheels upon turning, on the basis of a vehicle speed and turning radius.

In the meantime, $\Delta N = f(V,R)$ the target rotational speed differential $\Delta N$ may otherwise be obtained from a table which is previously set, such as shown in FIG. 6, on the basis of the vehicle speed V and turning radius R.

At step 57, a control signal for fully closing the orifice 17L or 17R is supplied to the outer wheel side control coupling 7L or 7R for thereby selecting a transfer torque characteristic capable of transmitting a maximum torque for a given rotational speed differential, and a control signal for partly opening the orifices 17R or 17L is supplied to the inner wheel side coupling 7R or 7L for selecting a transfer torque characteristic capable of producing a transfer torque equal to that produced by the outer wheel side control coupling 7L or 7R, i.e., equal to that transmitted to the outer wheel when the target rotational speed differential $\Delta N$ is obtained.

Figure 7:
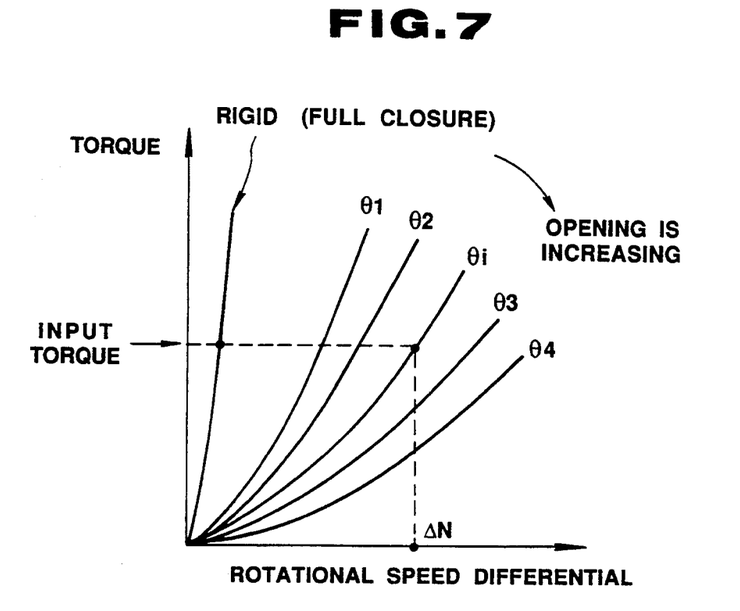
FIG. 7 is a graph of various transfer torque characteristics effected by the torque distribution control device of FIG. 2.

The method of determining the orifice opening $\theta i$ of the variable orifice 17L or 17R of the inner wheel side control coupling 7L or 7R will be described. As shown in FIG. 7, when the target rotational speed differential $\Delta N$ occurs between the wheels 6L and 6R, a transfer torque characteristic capable of producing a transfer torque equal to that to the outer wheel is determined, and an orifice opening capable of attaining this transfer torque characteristic is then determined. In this connection, the torque transmitted to the outer wheel is computed from the engine rpm, throttle opening and reduction ratio.

The torque distribution to the rear wheels in the event of straight ahead running and that in the event of turning will be described hereinafter, separately.

(a) First, in the event of straight ahead running, the control is executed to follow the steps 50 to 52, thus causing the variable orifices 16L and 16R to be fully closed.

Accordingly, in the event of straight-ahead running, a condition similar to a differential-locked condition is obtained, thus allowing an engine torque to be evenly distributed to the left and right rear wheels 6L and 6R and therefore making it possible to attain an excellent driveability and a straight-ahead running stability due to the capability of preventing the differential action between the left and right rear wheels 6L and 6R.

In the meantime, a relation between the transfer torque and the rotational speed differential $\Delta N$ is represented by a curve of a secondary order as shown in FIG. 7, i.e., a transfer torque increases along a curve of a secondary order in response to an increase of a rotational speed differential $\Delta N$ between an input power and output power. When the orifice opening is fully closed, a slight rotational speed differential causes the control couplings 7L and 7R to be put into a condition similar to a differential-locked condition.

(B) In the event of turning:

In the event of turning, the control is executed to follow the steps 50–57, thus causing the outer wheel side control coupling 7L or 7R to fully close and the inner wheel side control coupling 7R or 7L to be controlled to an orifice opening in response to an input torque to the outer wheel side control coupling 7L or 7R and a target rotational speed differential $\Delta N$ between the left and right rear wheels 6L and 6R.

Accordingly, in the event of turning without slip between tire and road surface, such a differential function is obtained in which the speed of rotation of the inner wheel 6L or 6R is reduced by the target rotational speed differential $\Delta N$ as compared to that of the outer wheel 6R or 6L, thus making it possible to attain a smooth turning.

Regarding transfer of torque, the torque distribution control device of this invention distributes torque evenly to the left and right wheels similarly to the conventional differential, i.e., it has an even torque distribution function, thus making it possible to attain a stable turning ability even in the case of turning on a low-$\mu$ (low roughness) road, sudden depression on an accelerator pedal, etc.

Further, the transfer torque to the inner wheel side is equal to that produced by the full closure of the orifice opening and transmitted to the outer wheel side, thus making it possible to increase the total amount of torque transmitted to the left and right wheels and attain a better driveability as compared with the prior art multi-disk clutch type adapted to allow a rotational speed differential between the left and right wheels by reducing the transfer torque to the inner wheel side upon turning.

From the foregoing, it will be understood that the torque distribution control device of this invention employs rotational speed differential responsive type control couplings 7L and 7R as torque transfer means and is adapted to control the control couplings 7L and 7R in such a manner that in the event of turning the variable orifices of the outer wheel side control coupling are fully closed to produce a maximum transfer torque and the variable orifices of the inner wheel side control coupling are partly closed so as to allow a target rotational speed differential between the left and right wheels and produce a transfer torque equal to that of the outer wheel side when the target rotational speed differential $\Delta N$ is obtained, thus making it possible to attain, with a reduced size and weight, an improved driveability during turning and a high turning stability irrespective of a road surface condition, accelerating operation, etc.

Figure 8:
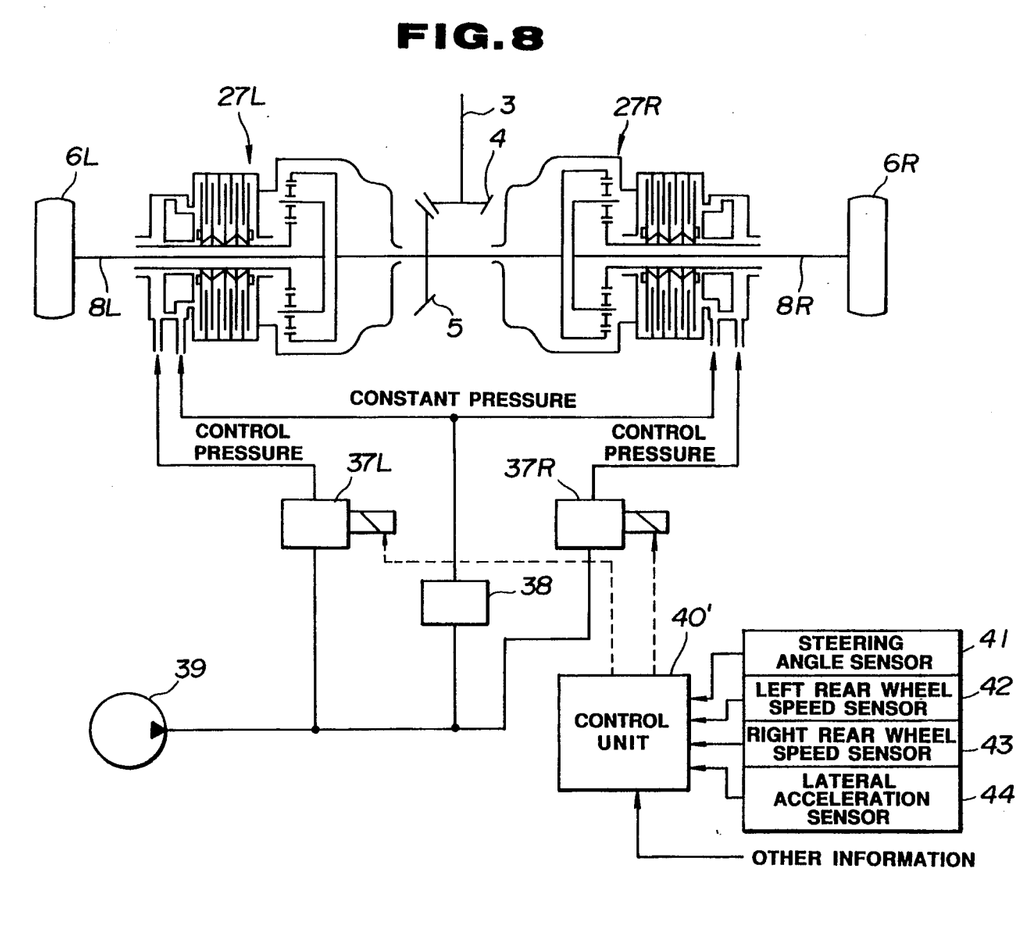
FIG. 8 is a schematic view of a torque distribution control device according to a further embodiment.

Referring to FIG. 8, a torque distribution control device according to another embodiment of the present invention will be described. In this embodiment, viscous couplings 27L and 27R are employed to constitute the aforementioned rotational speed differential responsive type control couplings. As compared with the previous embodiment in which the torque transfer characteristic is variably controlled through variation of the orifice opening, the torque transfer characteristic of this embodiment is varied through variation of the clearances and inside volume with respect to the inner plates and outer plates of the viscous couplings 27L and 27R, which is attained through control of hydraulic pressure.

Indicated by 37L and 37R in FIG. 8 are solenoid valves for the aforementioned control of hydraulic pressure, and by 38 is a control valve for maintaining a constant pressure, and by 39 is a pressure source.

The structure of this embodiment is substantially similar to the previous embodiment of FIGS. 1 to 7 except for the above and therefore repeated description thereto is omitted for brevity.

The torque distribution control device of FIG. 8 operates as follows.

Figure 9:
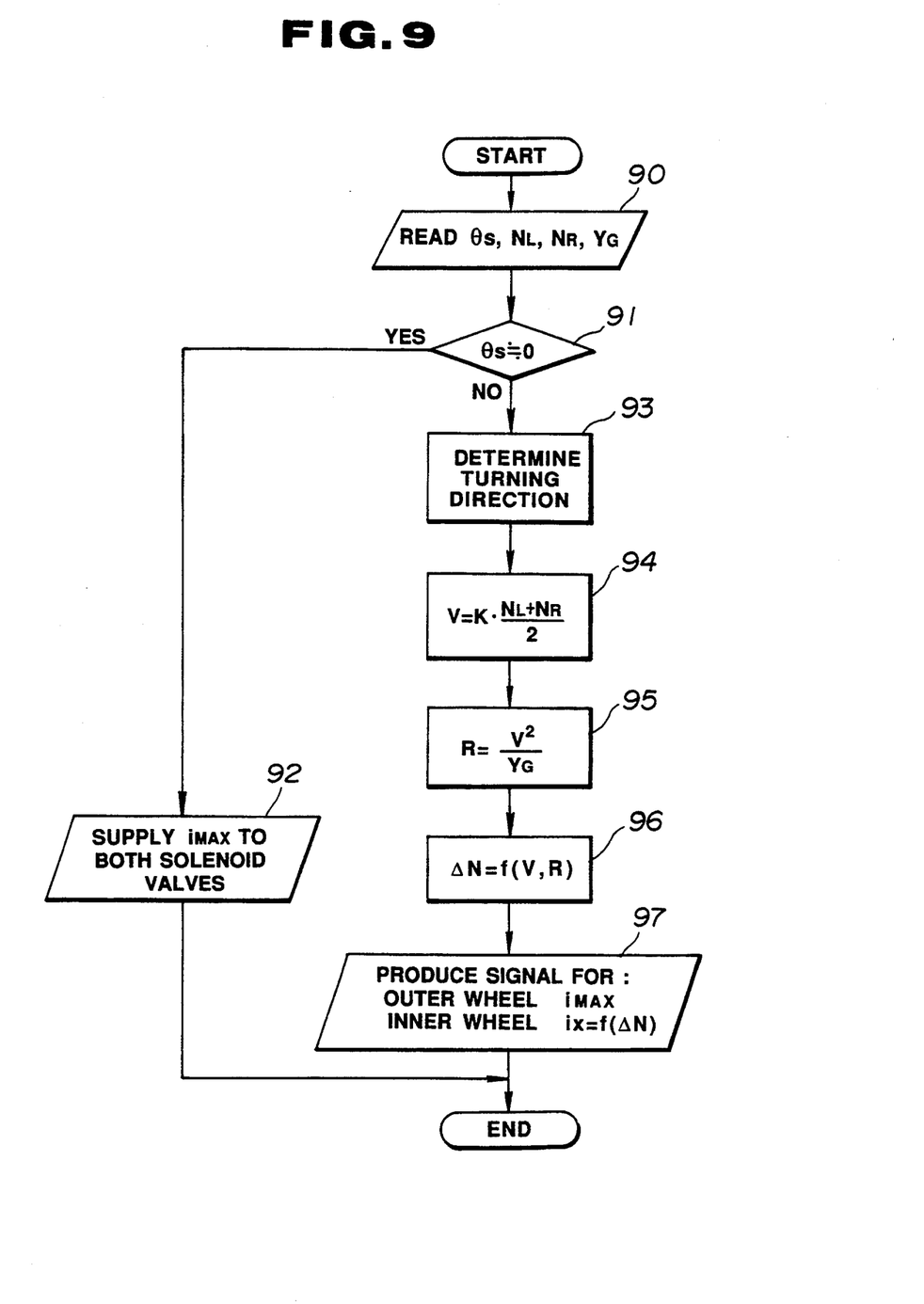
FIG. 9 is a flowchart of a routine of control operations executed by the torque distribution control device of FIG. 8.

FIG. 9 shows a routine of control operations executed by a control unit 40' repeatedly with a predetermined control cycle.

Step 90 and step 91 correspond to step 50 and step 51 of FIG. 5, respectively.

At step 92, when it is judged that the vehicle is running straight ahead, a solenoid control current i MAX is supplied to each solenoid valve 37L and 37R.

Step 93 to step 96 correspond to step 53 to step 56, respectively.

At step 97, when it is judged that the vehicle is turning, a solenoid control current i MAX is supplied to the outer wheel side viscous coupling 27L or 27R for selecting a transfer torque characteristic capable of producing a maximum transfer torque for a given rotational speed differential, and a solenoid control current i x is supplied to the inner wheel side viscous coupling 27R or 27L for selecting a transfer torque characteristic capable of producing a transfer torque equal to an input torque to the outer wheel side when a target rotational speed differential ΔN between the left and right rear wheels 6L and 6R is obtained.

Figure 11:
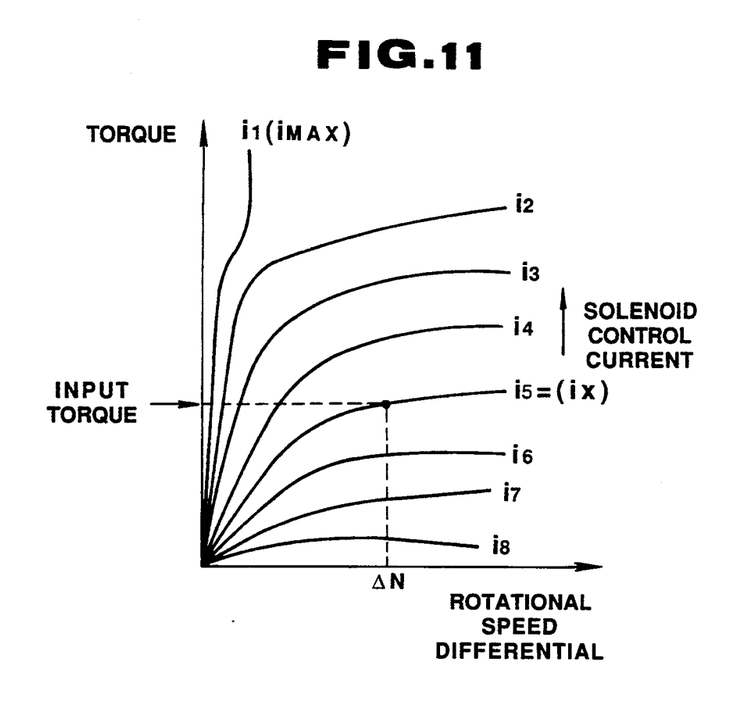
FIG. 11 is a graph of a relation between a solenoid operating electric current and a resulting hydraulic control pressure.

The solenoid control current i x is determined as follows. When the target rotational speed differential ΔN between the left and right wheels 6L and 6R occurs, a torque transfer characteristic capable of producing a transfer torque equal to the input torque to the outer wheel side is selected as shown in FIG. 11, and a solenoid control current capable of obtaining the transfer torque characteristic is determined. In this connection, the input torque to the outer wheel side is computed from an engine rpm, throttle opening and reduction ratio.

Figure 10:
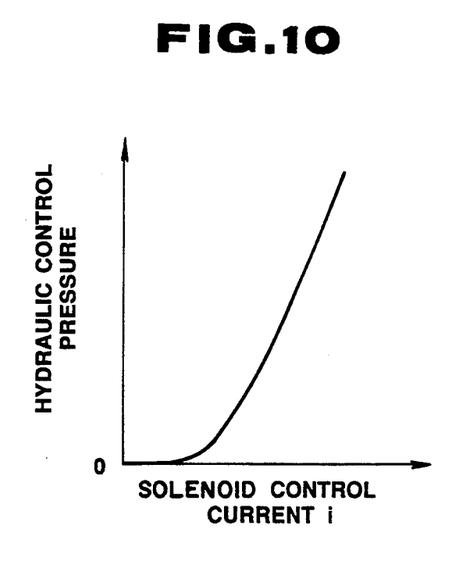
FIG. 10 is a graph of various transfer torque characteristics effected by the torque distribution control device of FIG. 8.

The relation between the solenoid control current i and control oil pressure is adapted, as shown in FIG. 10, to exhibit such a characteristic that the control oil pressure increases along a curve of a secondary order in response to an increase of the solenoid control current ix.

This embodiment can produce substantially the same effect as the previous embodiment.

While two types of rotational speed differential responsive type control couplings have been described and shown as above, they are not for the purpose of limitation but they may be replaced by other types so long as they can produce a variable transfer torque in response to a variation of a rotational speed differential and the transfer torque characteristic is controllable by an external signal.

Further, while the present invention has been described and shown as being applied to a rear wheel drive vehicle, this is not for the purpose of limitation but it may be applied to a front wheel drive vehicle to control torque distribution to front wheels or to a four-wheel drive vehicle to control torque distribution to front wheels and to rear wheels, respectively.

What is claimed is:

1. A torque distribution control device for a vehicle having two laterally opposed wheels, two output shafts respectively connected to the wheels to rotate therewith, and an input shaft for supplying an engine torque to the output shafts, comprising:

a first rotational speed differential responsive type control coupling disposed between the input shaft and one of the output shafts;

a second rotational speed differential responsive type control coupling disposed between the input shaft and the other of the output shafts;

said first and second control couplings each having various transfer torque characteristics and being operable to select one of said transfer torque characteristics in response to a signal supplied thereto;

turning direction detecting means for detecting a turning direction of the vehicle and producing a signal representative thereof;

vehicle speed detecting means for detecting a vehicle speed and producing a signal representative thereof;

turning radius computing means for computing a turning radius and producing a signal representative thereof;

target rotational speed differential computing means responsive to the signals from said vehicle speed detecting means and said turning radius computing means for computing a target rotational speed differential between the wheels which allows for turning without slip between tire and road surface, on the basis of the vehicle speed and the turning radius; and control means for supplying to an outer wheel side one of said control couplings, which outer wheel side one is determined on the basis of the signal from said turning direction detecting means, a signal for selecting one of said transfer torque characteristics that can produce a maximum transfer torque for a given rotational speed differential and for supplying to an inner wheel side one of said control couplings a signal for selecting, when said target rotational speed differential is obtained, one of said transfer torque characteristics that can produce a transfer torque equal to that produced by the outer wheel side one of said control couplings.

2. A torque distribution control device according to claim 1, wherein said control means comprises means for causing, when the vehicle is turning, the inner wheel side one of said control couplings to allow said target rotational speed differential.

3. A torque distribution control device according to claim 2, wherein said various torque transfer characteristics differ in a ratio of a rotational speed differential to which said control couplings are subjected and a transfer torque resultantly produced by said control couplings.

4. A torque distribution control device according to claim 3, wherein said control means comprises means for causing, when the vehicle is running straight ahead, both of said control couplings to select one of the torque transfer characteristics that produce a maximum transfer torque for a given rotational speed differential.

5. A torque distribution control device according to claim 4, wherein said control means comprises means for computing the transfer torque produced by the outer wheel side one of said control couplings on the basis of an engine rpm, a throttle opening and a reduction ratio.

6. A torque distribution control device according to claim 4, wherein said turning direction detecting means comprises a steering angle sensor for detecting a steering angle and producing a signal representative thereof, said control means further comprising means for determining whether the vehicle is turning on the basis of the signal from said steering angle sensor.

7. A torque distribution control device according to claim 6, wherein said vehicle speed detecting means comprises a first wheel speed sensor for detecting a speed of rotation of one of the wheels, a second wheel speed sensor for detecting a speed of rotation of the other of the wheels, and means for computing the vehicle speed on the basis of the speeds of rotation of the wheels.

8. A torque distribution control device according to claim 7, wherein said turning radius computing means comprises a lateral acceleration sensor for detecting a lateral acceleration of the vehicle and means for computing the turning radius on the basis of the vehicle speed and the lateral acceleration.

9. A torque distribution control device according to claim 8, wherein said target rotational speed differential computing means comprises means for computing said target rotational speed differential on the basis of the vehicle speed and the turning radius.

10. A torque distribution control device according to claim 8, wherein said target rotational speed differential computing means comprises table means for determining the target rotational speed differential on the basis of the vehicle speed and the turning radius.

11. A torque distribution control device according to claim 1, wherein each of said control couplings is of the type having a rotor and a cam ring rotatable relative to each other, hydraulic fluid discharge means responsive to a rotational speed differential between said rotor and said cam ring for discharging a quantity of hydraulic fluid proportional to said rotational speed differential, and variable orifice means for restricting discharge of said hydraulic fluid by said hydraulic fluid discharge means and thereby producing a transfer torque between said rotor and said cam ring, said control means controlling an orifice opening of said variable orifice means for selection of the torque transfer characteristics.

12. A torque distribution control device according to claim 11, wherein said cam rings of said control couplings are connected to constitute an integral unit, said integral unit of said cam rings having secured thereto a ring gear, said input shaft having a pinion meshing with said ring gear.

13. A torque distribution control device according to claim 1, wherein each of said control couplings are viscous couplings each having an inner volume and a plurality of spaces between alternately arranged and relatively axially movable plates, which inner volume and spaces are variable through variation of a control fluid pressure supplied thereto.

14. A torque distribution control device for a vehicle having two laterally opposed wheels, two output shafts respectively connected to the wheels to rotate therewith, and an input shaft for supplying an engine torque to the output shafts, comprising:
  a first rotational speed differential responsive type control coupling disposed between the input shaft and one of the output shafts;
  a second rotational speed differential responsive type control coupling disposed between the input shaft and the other of the output shafts;
  said first and second control couplings each having various transfer torque characteristics and being operable to select one of said transfer torque characteristics in response to a signal supplied thereto;
  vehicle running condition detecting means for detecting a vehicle running condition and producing a signal representative thereof; and
  control means for supplying to each of said first and second control couplings a signal for controlling selection of said torque transfer characteristics in response to the signal from said vehicle running condition detecting means.

* * * * *